(12) United States Patent
Wong

(10) Patent No.: US 7,464,020 B1
(45) Date of Patent: Dec. 9, 2008

(54) VISIBLY DISTINGUISHING PORTIONS OF COMPOUND WORDS

(75) Inventor: Chung Kei Wong, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 776 days.

(21) Appl. No.: 10/671,096

(22) Filed: Sep. 24, 2003

(51) Int. Cl.
*G06F 17/28* (2006.01)

(52) U.S. Cl. .............................................. 704/4; 704/6
(58) Field of Classification Search .................. 704/4, 704/6
See application file for complete search history.

(56) References Cited

U.S. PATENT DOCUMENTS

| | | | |
|---|---|---|---|
| 6,349,282 B1 * | 2/2002 | Van Aelten et al. | 704/257 |
| 6,363,179 B1 * | 3/2002 | Evans et al. | 382/309 |
| 6,393,399 B1 * | 5/2002 | Even | 704/257 |
| 6,729,882 B2 * | 5/2004 | Noble | 434/167 |
| 6,738,741 B2 * | 5/2004 | Emam et al. | 704/251 |
| 7,249,121 B1 * | 7/2007 | Bharat et al. | 707/3 |
| 2003/0097252 A1 * | 5/2003 | Mackie | 704/9 |
| 2003/0233235 A1 * | 12/2003 | Park | 704/257 |
| 2005/0033565 A1 * | 2/2005 | Koehn | 704/5 |

* cited by examiner

*Primary Examiner*—David R Hudspeth
*Assistant Examiner*—Jakieda R Jackson
(74) *Attorney, Agent, or Firm*—Hickman Palermo Truong & Becker LLP; Christian A. Nicholes

(57) ABSTRACT

A method and apparatus for displaying a compound word is provided. According to one aspect, a component word is located within a compound word. The compound word is displayed with the component word visibly distinguished from the remainder of the compound word. As a result, the compound word is displayed in a way that implements useful highlighting even when only a portion of the compound word is of interest to a searcher.

6 Claims, 8 Drawing Sheets

VISIBLY DISTINGUISHING PORTIONS OF COMPOUND WORDS

RELATED APPLICATIONS

The present application is related to the following U.S. patent applications, the entire contents of which are incorporated herein by reference for all purposes:

U.S. patent application Ser. No. 10/671,026, filed on the same day herewith, entitled VISIBLY DISTINGUISHING PORTIONS OF COMPOUND WORDS, by Bruce Karsh, Martin Eckert, and Chung Kei Wong.

FIELD OF THE INVENTION

The present invention relates to search engines, and in particular, to displaying compound words contained in results retrieved by a search engine such that selected portions of displayed compound words are visibly distinguished from the remainders of those compound words.

BACKGROUND OF THE INVENTION

A search engine is a computer program that helps a user to locate information. To locate information on a particular topic, a user can submit to a search engine one or more search query terms related to the topic. In response, the search engine executes the search query and generates information about the results of the search. The information about the results of the search usually contains a list of the resources that satisfy the search query.

While search engines may be applied in a variety of contexts, search engines are especially useful for locating resources that are accessible through the Internet. Resources may include files whose content is composed in a page description language such as Hypertext Markup Language (HTML). Such files are typically called pages. Using a web browser, pages may be retrieved by selecting HTML links that contain the Universal Resource Locators (URLs) of the pages.

Pages may contain words from different languages. For example, one page might contain words from the German language, and another page might contain words from the Korean language. Some words might be compound words. A compound word is a word that contains two or more component words that are independent words in their own right. For example, one English compound word is "firehouse." The separate words "fire" and "house" both have independent meanings when standing alone. The words "fire" and "house" are component words within the compound word "firehouse."

In some languages, such as German and Korean, it is common to connect two or more words together to form a compound word, even though the compound word might not have any meaning other than the meaning of its constituent component words. For example, when used together, the German words "kind" and "buch" become the single compound word "kinderbücher."

One searching for the English words "fire" or "house" is probably not interested in seeing pages that contain the compound word "firehouse." Similarly, one searching for the English words "grass" or "hop" is probably not interested in seeing pages that contain the compound word "grasshopper." In English, the meanings of the compound words "firehouse" and "grasshopper" are only loosely related to their component words.

In some languages, such as German and Korean, component words within a compound word are more likely to retain their individual meaning despite being within the compound word. Thus, someone in Germany searching for "buch" would likely be interested in seeing search results that contain the compound word "kinderbücher." Because many German language pages relating to "buch" are likely to contain "buch" only as a component word within a compound word, ignoring pages that contain "buch" only as a component word within a compound word may cause many highly relevant pages to be missed.

Unfortunately, many search engines do miss highly relevant pages as a result of such ignorance. If such pages are not ignored, other complications arise. For example, it is desirable for a search engine to "highlight" instances of a search term found in a page or summary description of a page. Highlighting a word means visibly distinguishing that word from other words. For example, a highlighted word may be displayed in a bold, italicized, underlined, or differently colored font. By highlighting an instance of a search word, a searcher's attention is drawn to the search word so that the searcher can quickly ascertain the context of the search word within a page. However, unless a search is for an entire compound word, compound words typically are not highlighted at all.

The useful effects of highlighting would be significantly reduced if very long compound words were highlighted in their entirety even though only a component word thereof was relevant to a search. For example, highlighting would be less useful if the entire compound word "großlangenfeldjahreswagen" was highlighted when a user searched only for the word "jahre." In some languages, very long compound words are quite common.

To complicate matters further, in some languages, such as German, component words are not appended together in original form when forming a compound word. In German, some component words take an alternative form when connected together to form a compound word. An alternative form of a component word differs from the form that the component word takes when standing alone. For example, the compound word resulting from the connection of the component words "kind" and "buch" is "kinderbücher" rather than "kindbuch." In this case, the alternative form of "kind" is "kinder," and the alternative form of "buch" is "bücher." Sometimes, the alternative form of a component word differs so much from the original form of the component word that the alternative form of the component word does not contain the original form of the component word. This alteration makes proper highlighting more difficult.

Based on the foregoing, it is clearly desirable to provide a technique for displaying a compound word in a way that implements useful highlighting when only a portion of the compound word is of interest to a searcher. It is further desirable that the technique provides a way of dealing with alternative forms of component words.

SUMMARY OF THE INVENTION

Techniques are provided for displaying compound words. According to one aspect, a component word is located within a compound word. The compound word is displayed with the component word visibly distinguished from the remainder of the compound word. As a result, the compound word is displayed in a way that implements useful highlighting even when only a portion of the compound word is of interest to a searcher.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for visibly distinguishing compound words is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Figure 1:
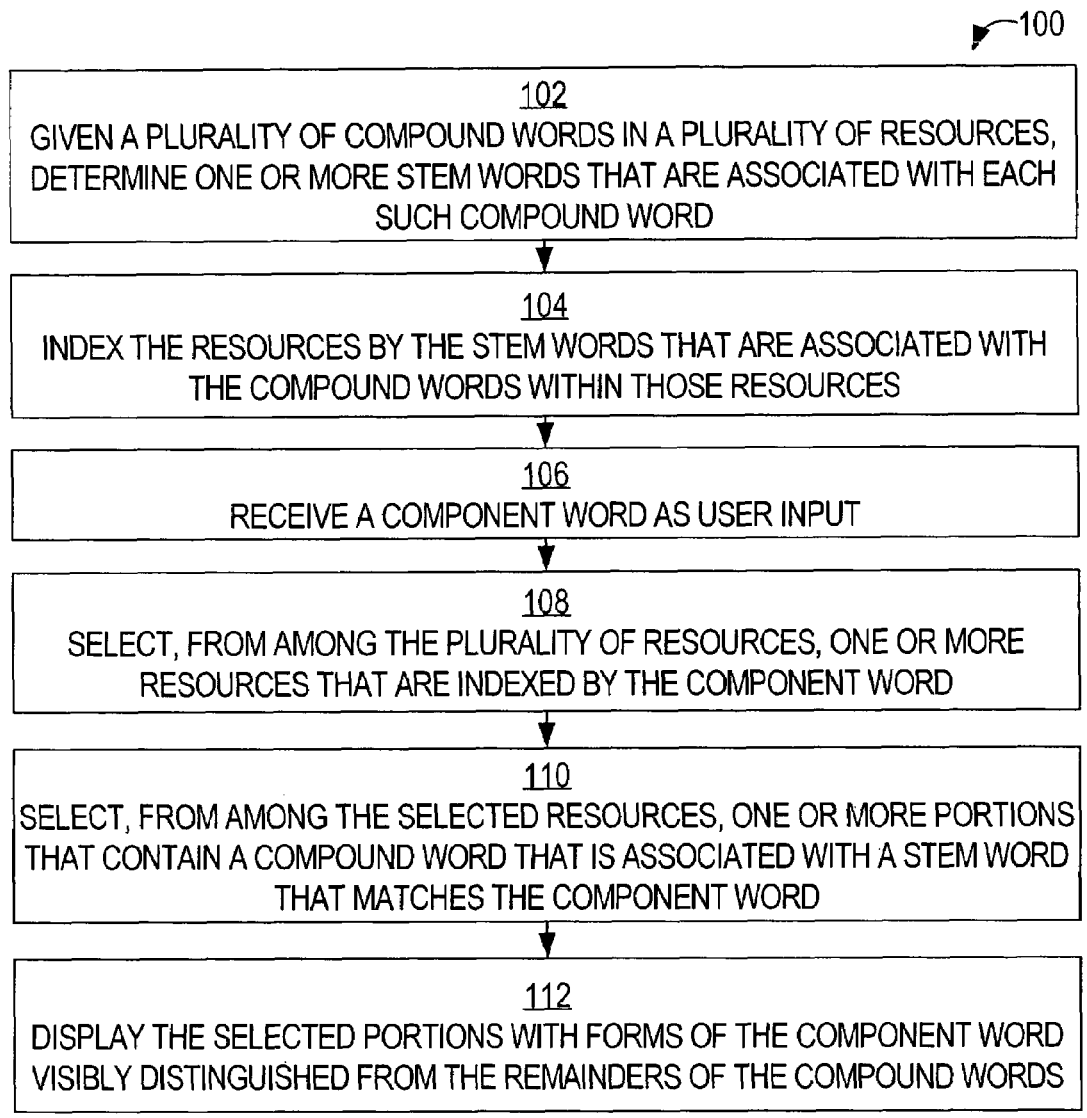
FIG. 1 is a flow diagram that illustrates a technique, according to an embodiment of the present invention, for highlighting search terms that are components of compound words.

FIG. 1 is a flow diagram that illustrates a technique 100, according to an embodiment of the present invention, for highlighting search terms that are components of compound words.

In block 102, given a plurality of compound words in a plurality of resources, one or more stem words associated with each such compound word are determined. For example, two or more words associated with a compound word may be determined using a "lexer" computer product such as that made commercially available by Inxight Software, Inc., or Basis Technology Corp. A "lexer" receives a compound word as input and outputs stem words that are associated with the compound word. For example, given the German compound word "kinderbücher," a lexer might return the German stem words "kind" and "buch." For another example, given the Korean compound word for "ice cream," a lexer might return, as stem words, the Korean words for "ice" and "cream."

Such stem words might or might not be contained letter-for-letter within the compound word. Typically, each stem word is in the form in which the stem word appears in a dictionary. Typically, each stem word is in the form that the stem word would take when standing alone.

In block 104, the resources are indexed by the stem words that are associated with the compound words within those resources. For example, a page containing the German compound word "kinderbücher" would be indexed by stem words "kind" and "buch." For another example, a page containing the German compound word "kinderdorfer" would be indexed by stem words "kind" and "dorf." For another example, a page containing the Korean compound word for "ice cream" would be indexed by the Korean words for "ice" and "cream."

In block 106, a component word is received as user input. For example, a user may instruct a search engine to search for the Korean word for "ice." The search engine receives the word entered by the user.

In block 108, one or more resources that are indexed by the component word are selected from among the plurality of resources. Continuing the example, the search engine selects, from among a plurality of pages, pages that are indexed by the Korean word for "ice."

In block 110, one or more portions of the selected resources that contain a compound word that is associated with a stem word that matches the component word are selected from the selected resources. Continuing the example, the search engine generates a corresponding abstract for each selected page. Each abstract comprises a portion of a corresponding selected page. Each abstract contains a compound word that is associated with a stem word that matches the Korean word for "ice."

In block 112, the selected portions are displayed with forms of the component word visibly distinguished from the remainders of the compound words. Continuing the example, the search engine displays the abstracts, some or all of which contain the Korean compound word for "ice cream." In those abstracts that contain the Korean compound word for "ice cream," the Korean word for "ice" is highlighted, while the remainder of the compound word, the Korean word for "cream," is displayed in same manner as the rest of the abstract. Consequently, occurrences of the Korean word for "ice" are made to "jump out" at the user. This makes more sense than highlighting the entire Korean compound word for "ice cream," because the user only searched for "ice," not "ice cream." Thus, search terms within very long compound words are visibly distinguished from the remainder of those compound words, thereby helping a user to determine the context in which a page uses a search term.

In Korean and some other languages, a word takes the same form regardless of whether that word stands alone or whether that word is part of a compound word. Therefore, when dealing with such languages, the search engine looks for an exact match when locating and highlighting a component word within a compound word. In other languages, such as German, compound word formation can be more complex. A technique described below with reference to FIG. 2 may be used for locating and highlighting a German component word within a German compound word.

Fuzzy Matching

As mentioned above, some languages, such as Korean, concatenate component words in original form when forming a component word. Therefore, in such languages, a highlighting mechanism can locate a component word within a compound word using exact letter-to-letter matching techniques. However, in other languages, such as German, the form taken by a word when placed within a compound word sometimes differs from the form taken by that word when standing alone. Therefore, when dealing with these other languages, a "fuzzy matching" technique may be used to locate an alternative form of a component word within a compound word. Once located, the alternative form of the component word may be visibly distinguished from the remainder of the compound word that contains the alternative form of the component word.

Figure 2:
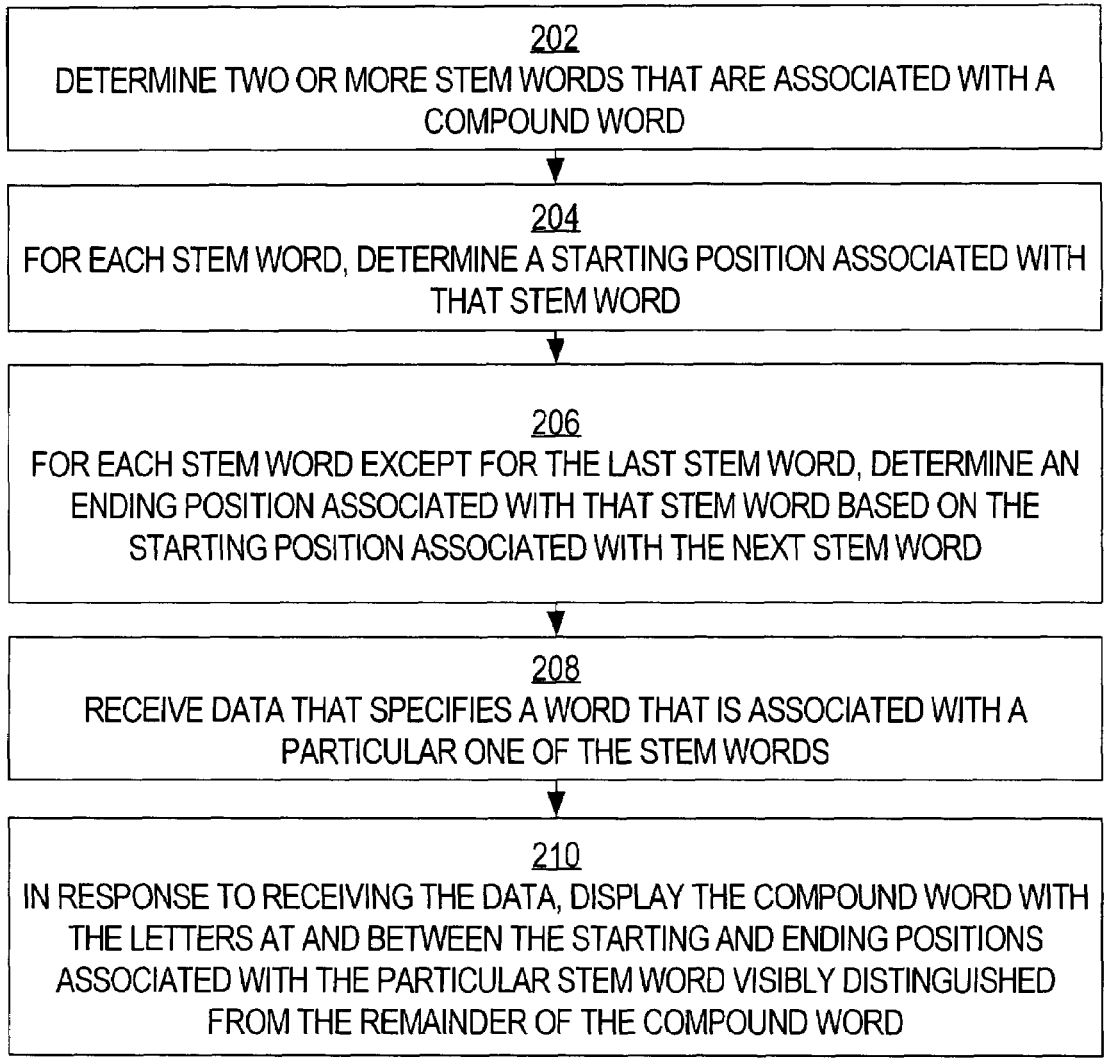
FIG. 2 is a flow diagram that illustrates a technique, according to an embodiment of the present invention, for highlighting a component word within a compound word based on starting and ending positions associated with two or more stem words.

Using the fuzzy matching technique, starting and ending positions of component words within a compound word are estimated. The starting position of one component word may be used to estimate the ending position of a preceding component word in the same compound word. FIG. 2 is a flow diagram that illustrates a technique 200, according to an embodiment of the present invention, for highlighting a component word within a compound word based on starting and ending positions associated with two or more stem words.

In block 202, two or more stem words that are associated with a compound word are determined. For example, two or more stem words associated with a compound word may be determined using a lexer computer product such as that made commercially available by Inxight Software, Inc., or Basis Technology Corp. Each stem word is associated with an order relative to the other stem words. Relative to the compound word "kinderbücher," the stem word "kind" is considered to be before the stem word "buch."

In block 204, for each stem word determined in block 202, a starting position associated with that stem word is determined. A technique for determining a starting position associated with a stem word is described below with reference to FIGS. 3A and 3B. For example, given the German compound word "kinderbücher," with stem words "kind" and "buch," the stem word "kind" would be associated with a starting position of one, and the stem word "buch" would be associated with a starting position of seven.

In block 206, for each stem word except for the last stem word, an ending position associated with the stem word is determined based on the starting position associated with the next stem word. For example, given that the starting position associated with the stem word "buch" is seven, the ending position associated with the stem word "kind" would be six; one less than seven. The ending position associated with the last stem word is the position at the end of the compound word. Therefore, in the present example, the ending position associated with "buch" is twelve.

In block 208, data that specifies a word is received. The word specified is associated with a particular one of the stem words. For example, a user may instruct a search engine to search for the word "buch." The search engine receives the word "buch," which is one of the stem words associated with the compound word "kinderbücher."

In block 210, in response to receiving the data received in block 208, the compound word is displayed with the letters at and between the starting and ending positions associated with the particular stem word visibly distinguished from the remainder of the compound word. In the present example, the compound word "kinderbücher" would be displayed, with all letters at and between positions seven and twelve visibly distinguished from the remainder of the compound word. This is because the stem word "buch," which is the search word, is associated with a starting position of seven and an ending position of twelve relative to the compound word "kinderbücher." As a result, only the component word "bücher" is highlighted in the compound word "kinderbücher;" the remainder, "kinder," is not highlighted.

Thus, an alternative form of a search term may be highlighted within a compound word. It should be noted in the above example that, although the search term "buch" was entered, the entire alternative form "bücher" was highlighted. The result is more appealing to the eye. It would look odd, given the compound word "kinderbücher" and the search term "buch," to highlight only "büch" and leave the "er" at the end of the word unhighlighted. Because "bücher" is the form that the word "buch" takes when combined with another word to form a compound word, it makes more sense to highlight "bücher."

It also should be noted that technique 200 may be used to find starting and ending positions of a compound word even when the form of the compound word remains the same both within and without a compound word. Therefore, technique 200 may be used to find starting positions of component words in Korean as well as in German.

Determining a Starting Position for a Stem Word

Figure 3A:
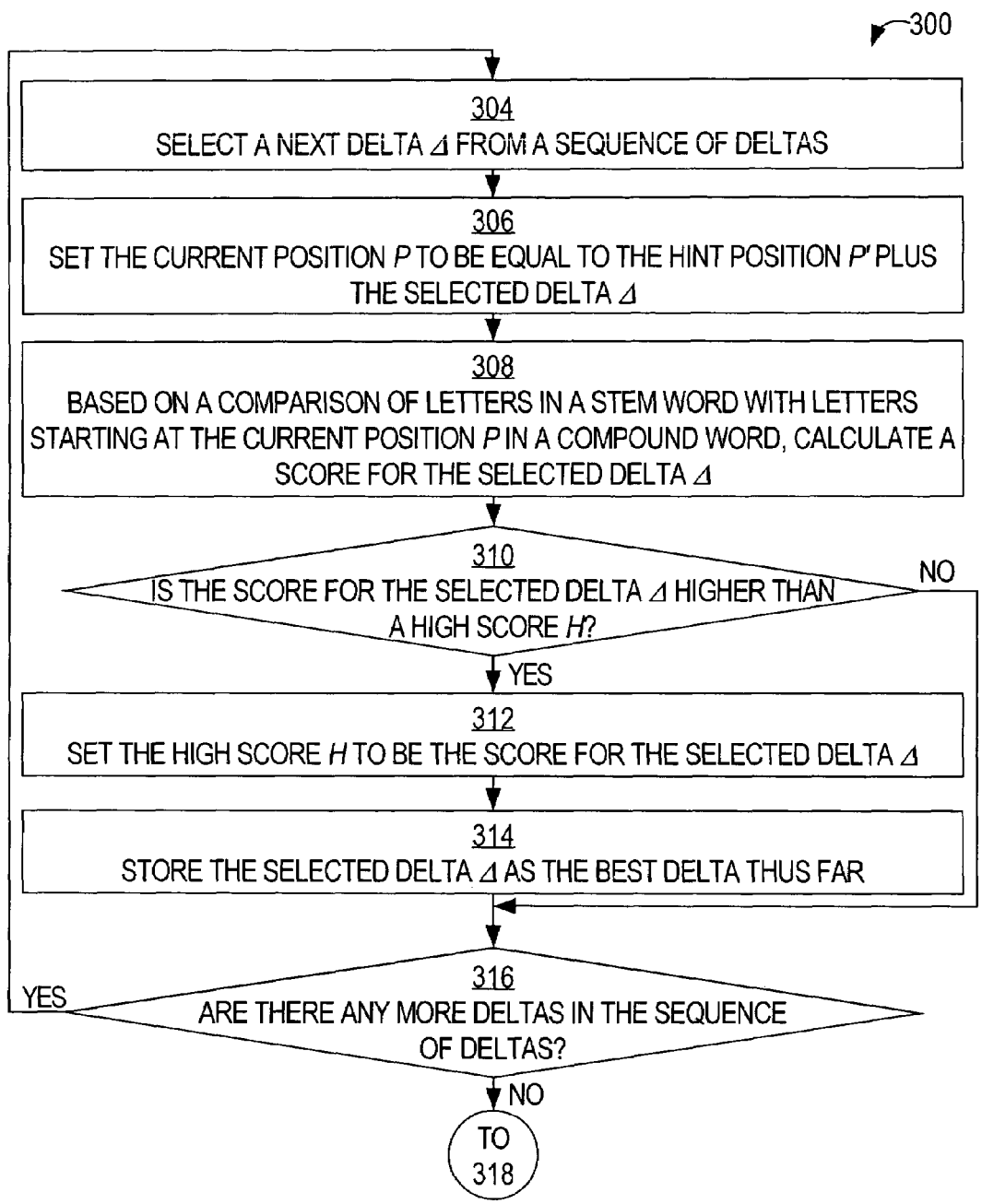
FIGS. 3A and 3B are flow diagrams that illustrate a technique, according to an embodiment of the present invention, for determining a starting position to be associated with a stem word.
Figure 3B:
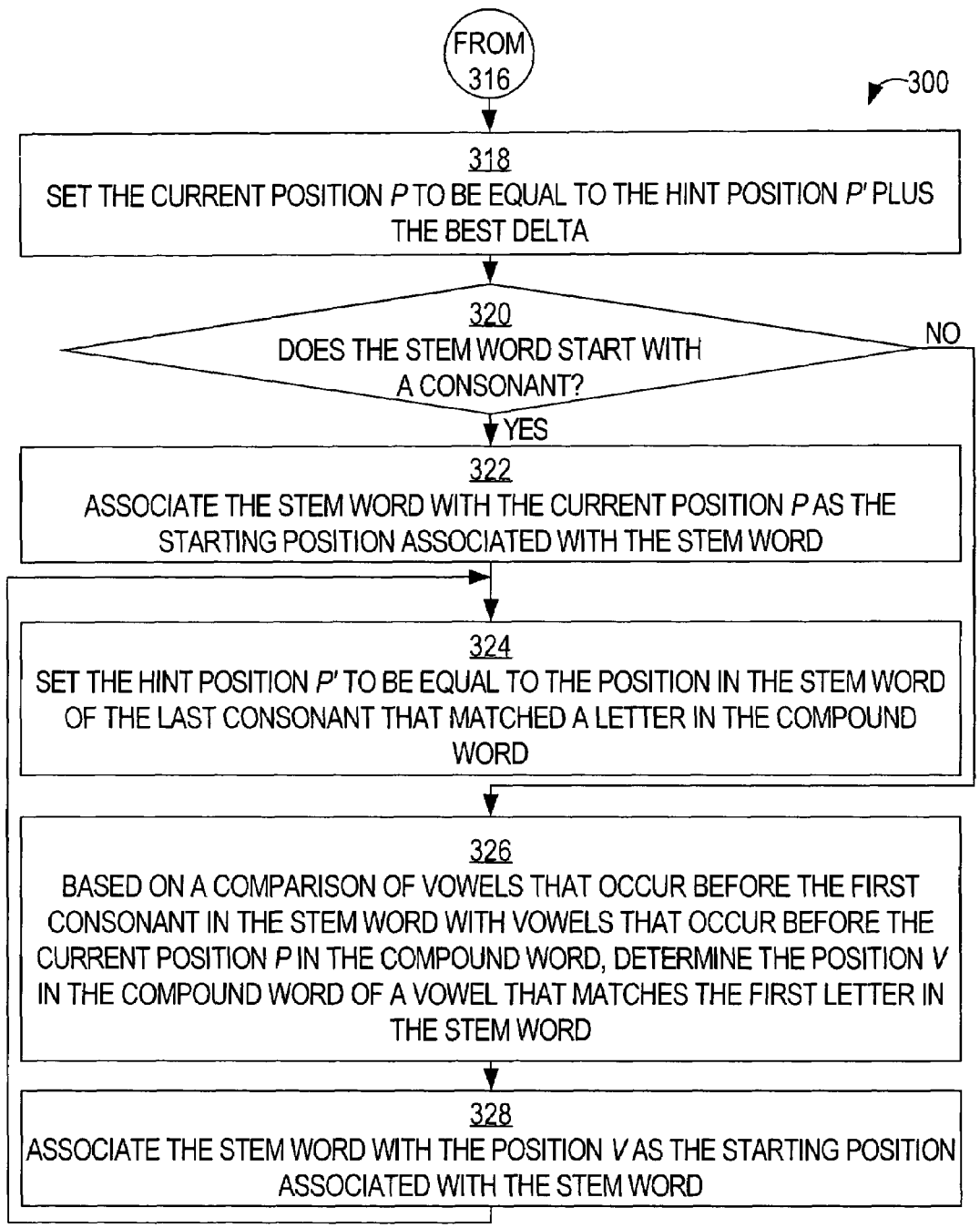

As described above, a starting position associated with a stem word is determined in block 204 of FIG. 2. FIGS. 3A and 3B are flow diagrams that illustrate a technique 300, according to an embodiment of the present invention, for determining a starting position to be associated with a stem word. Technique 300 also may be used to determine a "hint position" where a search for a starting position of a subsequent stem word may commence. Initially, for the first stem word associated with a compound word, the hint position, denoted herein as P', is set to be the first position in the compound word.

In block 304, a next delta A is selected from a sequence of deltas. For example, given a sequence of deltas such as (0, 1, −1, 2, −2, 3, −3, 4, −4, 5, 6, 7), the first delta selected would be 0, the second delta selected would be 1, the third delta selected would be −1, and so forth. Each delta in the sequence of deltas corresponds to a different position in the compound word. As described below, each delta in the sequence of deltas is assigned a separate score that represents how closely a sequence of letters associated with the corresponding position matches the stem word.

In block 306, the current position P is set to be equal to the hint position P' plus the selected delta Δ. For example, if the hint position P' was equal to 1 and the selected delta was equal to 0, then the current position P would be set to 1. If the hint position P' was equal to 1 and the selected delta was equal to 1, then the current position P would be set to 2. According to one embodiment, if the current position P comes before the first position in the compound word, then control passes back to block 304, wherein the next delta A is selected.

In block 308, based on a comparison of letters in a stem word with letters starting at the current position P in a compound word, a score corresponding to the selected delta A is calculated. A technique for calculating a score for a selected delta Δ is described below with reference to FIG. 5. Due to the observation that vowels tend to change the most between different forms of a component word, in an alternative embodiment, only consonants in the stem word and the compound word are compared; vowels are skipped. According to one such alternative embodiment, the number of vowels skipped in the compound word is not permitted to exceed the number of vowels skipped in the stem word.

In block 310, it is determined whether the score for the selected delta Δ is higher than a high score H that is associated with the stem word. Each separate stem word is associated with a separate high score H. Initially, each high score H is set to zero. If the score for the selected delta A is higher than the high score H for the stem word, then control passes to block 312. Otherwise, control passes to block 316.

In block 312, the high score H for the stem word is set to be equal to the score associated with the selected delta A.

In block 314, the selected delta Δ is stored as the "best delta" thus far. The position of the last consonant in the compound word that matched a consonant in the stem word also may be stored for use in determining a new hint position P' for the next stem word.

In block 316, it is determined if there are any more deltas in the sequence of deltas discussed above with reference to block 304. If there are more deltas in the sequence of deltas, then control passes back to block 304, wherein the next delta in the sequence becomes the selected delta A. If no other deltas are in the sequence of deltas, then control passes to block 318.

In block 318, the current position P is set to be equal to the hint position P' plus the best delta. For example, if the best delta is 0 and the hint position P' is 7, then the current position P is set to 7.

In block 320, it is determined whether the stem word starts with a consonant. If the stem word does start with a consonant, then control passes to block 322. If the stem word does not start with a consonant, then control passes to block 326. In other words, control passes to block 326 when the stem word starts with a vowel.

In block 322, the stem word is associated with the current position P. The current position P becomes the starting position associated with the stem word.

In block 324, the hint position P' is set to be equal to the position after the current position P in the compound word of the last consonant that matched a consonant in the stem word. For example, if the compound word is "kinderbücher," and the stem word is "kind," then at block 324, the current position P will be 1, and the position after the current position P in the compound word of the last consonant that matched a consonant in the stem word will be 4: the position of "d" in the compound word. As a result, in this case, the hint position P' is set to 4. This will be the hint position used during the determination of the starting position to be associated with the next stem word, "buch."

Alternatively, if the stem word starts with a vowel, then, in block 326, a position V in the compound word of a vowel that matches the first letter in the stem word is determined based on a comparison of vowels that occur before the first consonant in the stem word with vowels that occur before the current position P in the compound word. A technique for determining the position V is described below with reference to FIG. 6.

In block 328, the stem word is associated with the position V as the starting position associated with the stem word. For example, if position V is determined to be 3, then the starting position associated with the stem word is 3. Control then passes to block 324, wherein the new hint position P' is set.

As a result of technique 300, starting and ending positions for each stem word associated with a compound word may be determined using fuzzy matching. Using these starting and ending positions, a component word that exactly or approximately matches a search term may be highlighted within the compound word as described above with reference to FIG. 2.

Matching Highly Different Word Forms

Sometimes, the form taken by a word when standing alone differs greatly from the form taken by the word when combined with other words in a compound word. In some cases, it is possible that very few letters in a stem word will match any sequence of letters in the corresponding compound word, even when fuzzy matching is performed as described above.

For example, the German word "gut," when combined with other words to form a compound word, may become the German word "besten." The German word "bald," when combined with other words to form a compound word, may become the German word "ehesten." The German word "gem," when combined with other words to form a compound word, may become the German word "liebsten." The German word "viel," when combined with other words to form a compound word, may become the German word "meisen." Original forms of stem words may be associated with alternative forms of those stem words. Often, an alternative form associated with an original stem word is the superlative form of the original stem word. For example, in English, the superlative form of "good" is "best."

Searching for the original forms of such words within a compound word sometimes will not yield any good matches. Therefore, when a stem word such as those listed above is returned from a lexer, matching for both the original and associated alternative forms of the stem word is performed relative to the compound word. The position associated with the form that is associated with the highest score is used as the starting position.

Figure 4:
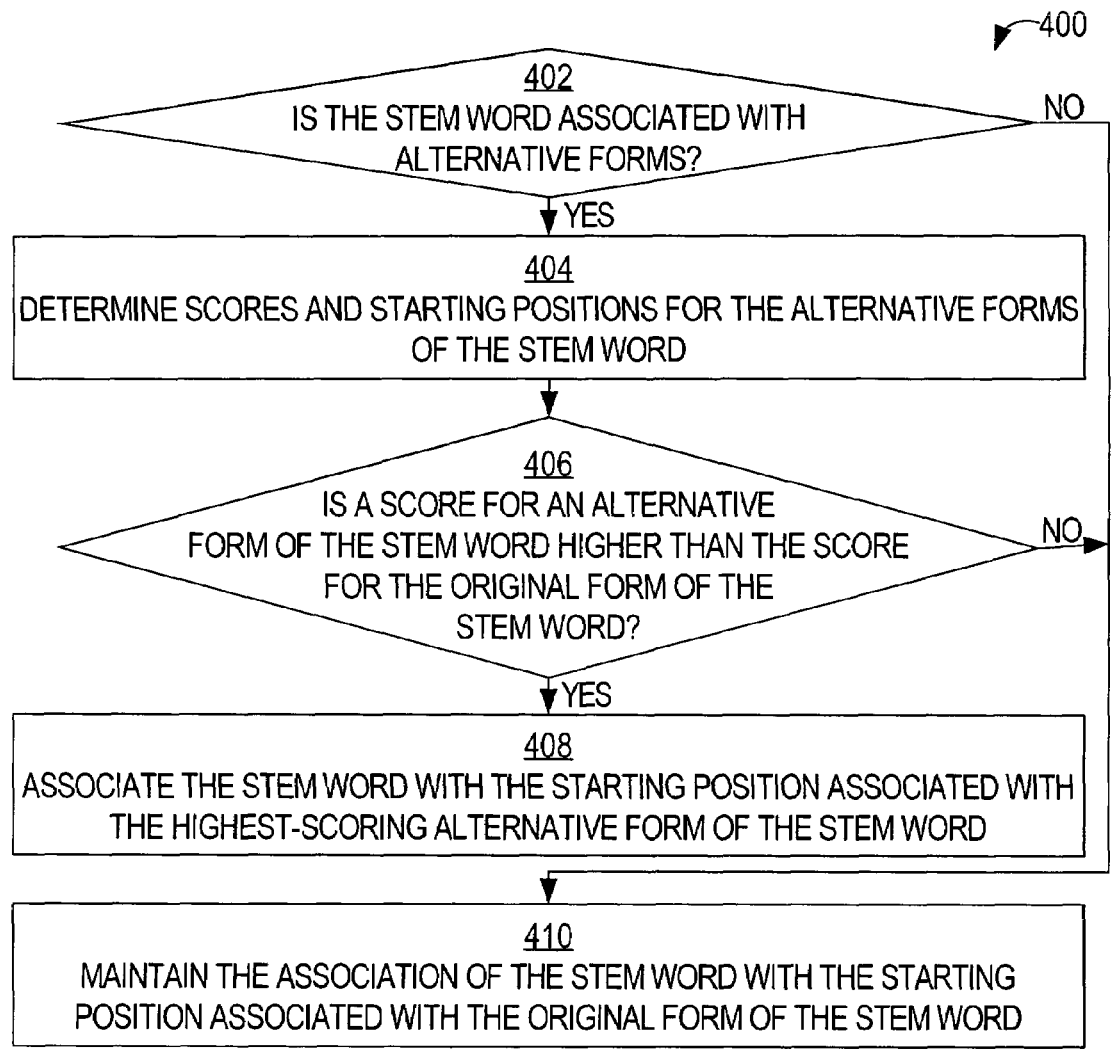
FIG. 4 is a flow diagram that illustrates a technique, according to an embodiment of the present invention, for determining, based on original and alternative forms of a stem word, a starting position to be associated with the stem word.

FIG. 4 is a flow diagram that illustrates a technique 400, according to an embodiment of the present invention, for determining, based on original and alternative forms of a stem word, a starting position to be associated with the stem word.

In block 402, it is determined whether the stem word is associated with one or more alternative forms. For example, a list of stem words that are associated with highly different alternative forms, including a mapping of those stem words to their alternative forms, may be consulted after a score has been calculated for the original form of the stem word. If the original form of the stem word is found in the list, then a separate score may be calculated for each of the stem word's associated alternative forms. If the stem word is associated with one or more alternative form, then control passes to block 404. Otherwise, control passes to block 410.

In block 404, a score and a starting position for each of the alternative forms of the stem word is determined. The score and starting position for an alternative form of the stem word may be determined using the same technique used to determine the score and starting position for the original form of the stem word, but substituting the alternative form for the original form. One such technique is described above with reference to FIGS. 3A and 3B.

In block 406, it is determined whether the score for an alternative form of the stem word is higher then the score for the original form of the stem word. If the score for the alternative form is higher, then control passes to block 408. Otherwise, control passes to block 410.

In block 408, the stem word is associated with the starting position associated with the alternative form of the stem word. For example, if the score associated with the alternative form "besten" is higher than the score associated with the original form "gut" relative to the compound word "bestenliste," then the starting position associated with the alternative form "besten" is associated with the stem word "gut." If there are multiple alternative forms of the stem word, then the stem word is associated with the starting position associated with the alternative form having the highest score.

Alternatively, in block 410, the association of the stem word with the starting position associated with the original form of the stem word is maintained.

Using technique 400, alternative forms of stem words that are very different from their corresponding original forms may be found and highlighted. This increases the consistency with which component words are highlighted properly within compound words, especially in languages such as German.

Calculating a Score for a Selected Delta

Figure 5:
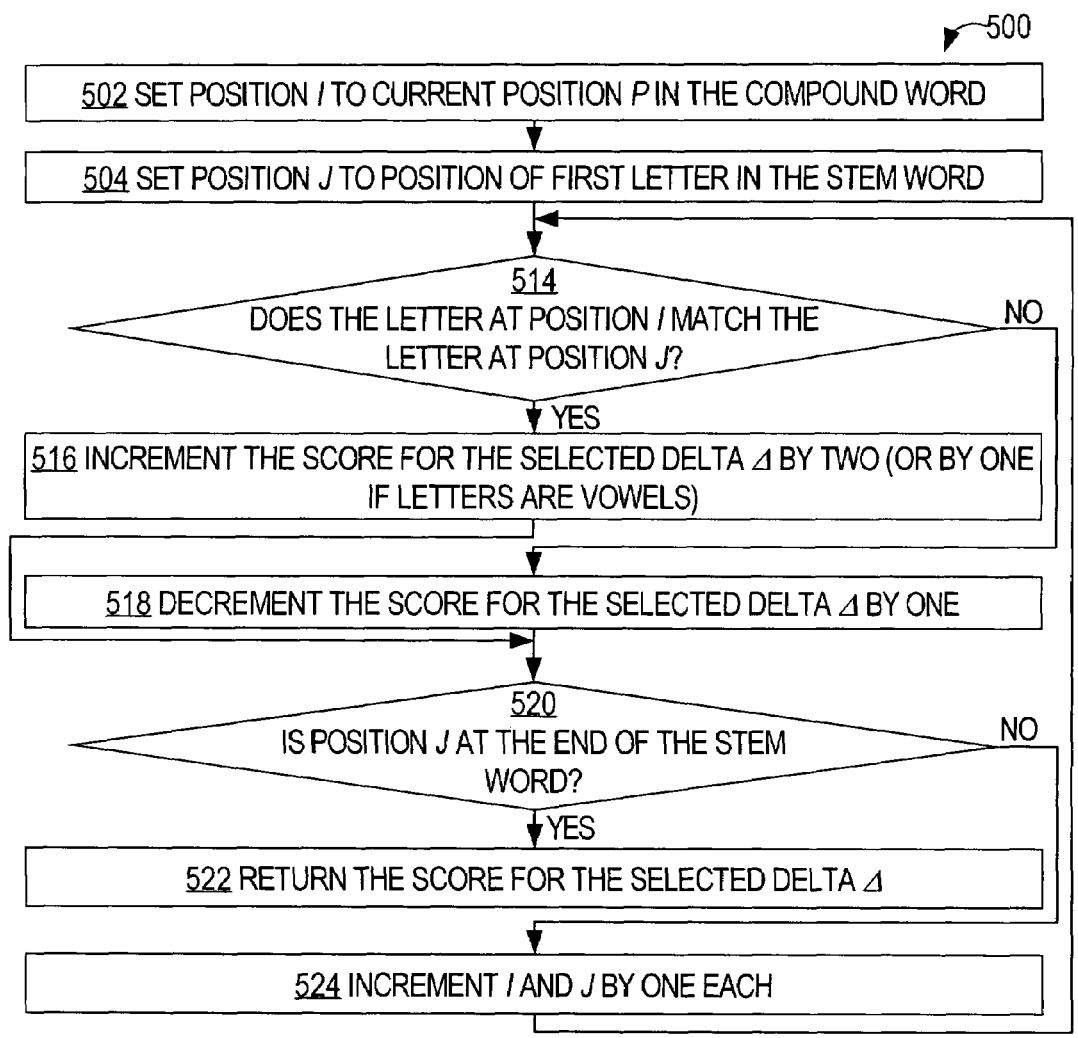
FIG. 5 is a flow diagram that illustrates a technique, according to an embodiment of the present invention, for calculating a score for a selected delta.

As described above with reference to block 308 of FIG. 3A, a score corresponding to a selected delta Δ is calculated based on a comparison of consonants in a stem word with consonants starting at a current position P in a compound word. FIG. 5 is a flow diagram that illustrates a technique 500, according to an embodiment of the present invention, for calculating a score for a selected delta.

In block 502, a position I is set to the current position P in the compound word.

In block 504, a position J is set to the position of the first letter in the stem word.

In block 514, it is determined whether the letter or sequence of letters at position I of the compound word match the letter or sequence of letters at position J of the stem word. The letters match if they are the same letter, or if the letters have the same base, or if the letters are mapped to each other in a letter mapping.

Two letters have the same base if the letters would be the same if not for the presence of marks, such as diacritical marks, above only one of the two letters. Umlauts and tildes are examples of such marks. Therefore, "u" has the same base as "u."

In some languages, one or more letters are equivalent to one or more letters in other languages. These letters or sequences of letters may be mapped to each other in a letter mapping so that they are considered to be the same in block 514. For example, "f" may be mapped to "ph" and vice-versa, and "β" may be mapped to "ss" and vice-versa. Thus, groβ matches "gross."

If the letter or sequence of letters at position I of the compound word matches the letter or sequence of letters at position J of the stem word, then control passes to block 516. Otherwise, control passes to block 518. According to one embodiment, at most one non-matching consonant is allowed. In such an embodiment, if more than one consonant does not match, then current position P is not considered to be a candidate starting position. In block 516, the score for the selected delta A is incremented by two. According to one embodiment, the score for the selected delta A is incremented by two only if the matching letters are consonants; if the matching letters are vowels, then the score for the selected delta A is incremented by just one. Control then passes to block 520.

Alternatively, in block 518, the score for the selected delta A is decremented by one. Control then passes to block 520.

In block 520, it is determined whether position J is at the end of the stem word. If position J is at the end of the stem word, then control passes to block 522. Otherwise, control passes to block 524.

In block 522, the current score for the selected delta Δ is returned. The current score becomes the score calculated as described above with reference to block 308 of FIG. 3A.

Alternatively, in block 524, position I is incremented by one, and position J is incremented by one. Control then passes back to block 506.

As a result of technique 500, a score for a currently selected delta is calculated. By performing technique 500 for each of many deltas, a separate score may be calculated for each such delta. The delta associated with the highest score may be used to determine the starting position for a stem word.

Figure 6:
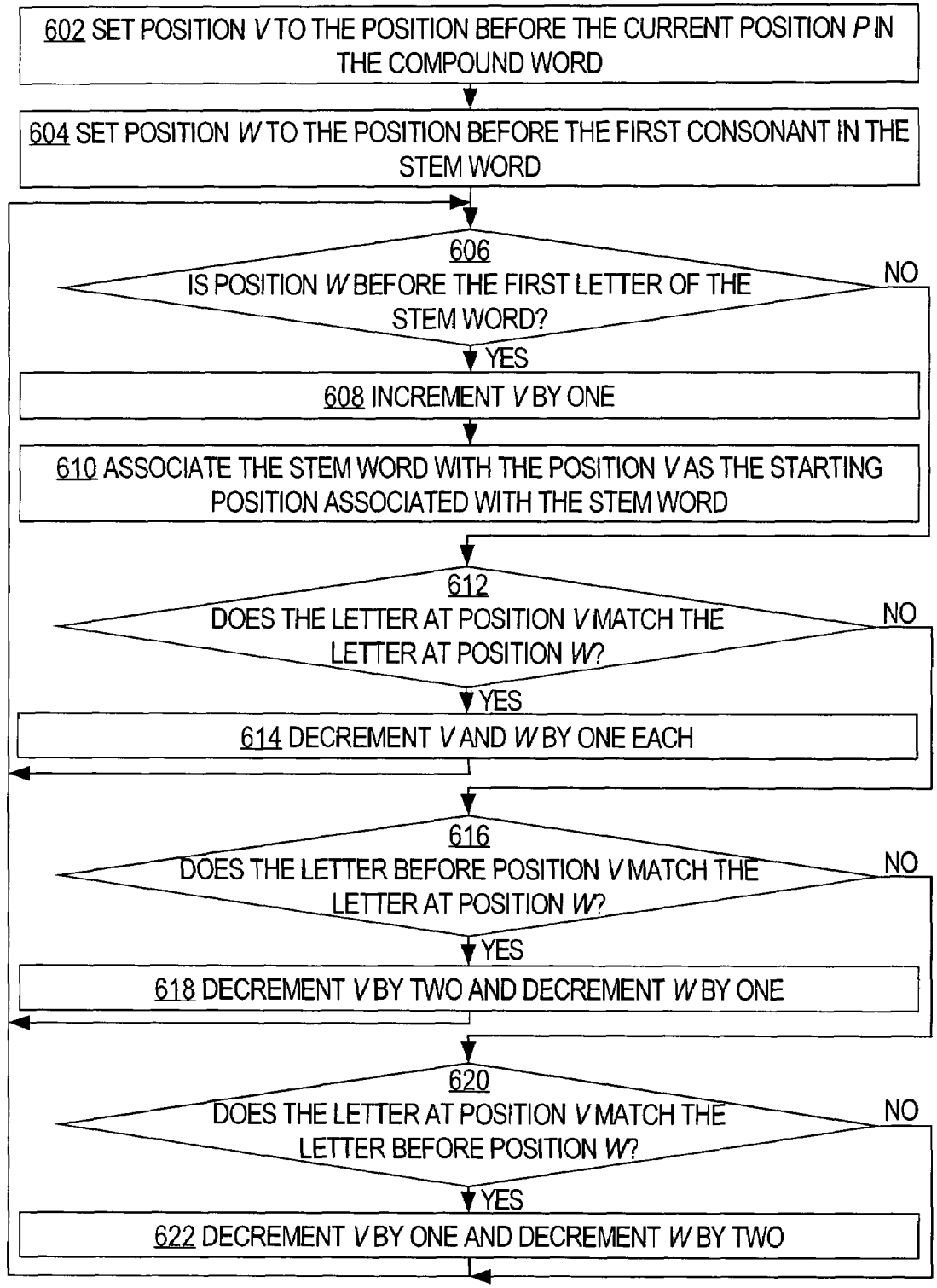
FIG. 6 is a flow diagram that illustrates a technique, according to an embodiment of the present invention, for determining a starting position to be associated with a stem word that begins with a vowel.

Determining a Starting Position to be Associated with a Stem Word that Begins with a Vowel As described above with reference to block 326 of FIG. 3B, a position V in a compound word of a vowel that matches the first letter in the stem word is determined based on a comparison of vowels that occur before the first consonant in the stem word with vowels that occur before the current position P in the compound word. FIG. 6 is a flow diagram that illustrates a technique 600, according to an embodiment of the present invention, for determining the position V.

In block 602, position V is set to the position before the current position P in the compound word.

In block 604, a position W is set to the position before the first consonant in the stem word.

In block 606, it is determined whether position W is before the first letter of the stem word. If position W is before the first letter of the stem word, then control passes to block 608. Otherwise, control passes to block 612.

In block 608, V is incremented by one.

In block 610, the stem word is associated with position V as the starting position associated with the stem word.

Alternatively, in block 612, it is determined whether the letter at position V matches the letter at position W. Again, letters match if they have the same bases or if they are mapped to each other. Two letters have the same base if the letters would be the same if not for the presence of marks, such as diacritical marks, above only one of the two letters. Therefore, "u" has the same base as "u." If the letter at position V matches the letter at position W, then control passes to block 614. Otherwise, control passes to block 616.

In block 614, V and W each are decremented by one. Control then passes back to block 606.

Alternatively, in block 616, it is determined whether the letter before position V matches the letter at position W. If the letter before position V matches the letter at position W, then control passes to block 618. Otherwise, control passes to block 620.

In block 618, V is decremented by two, and W is decremented by one. Control then passes back to block 606.

Alternatively, in block 620, it is determined whether the letter at position V matches the letter before position W. If the letter at position V matches the letter before position W, then control passes to block 622. Otherwise, control passes back to block 606.

In block 622, V is decremented by one, and W is decremented by two. Control then passes back to block 606.

As a result of technique 600, a more accurate starting position for a stem word that begins with a vowel may be determined. This allows more accurate component word highlighting in embodiments that initially skip vowels while performing fuzzy matching.

Hardware Overview

Figure 7:
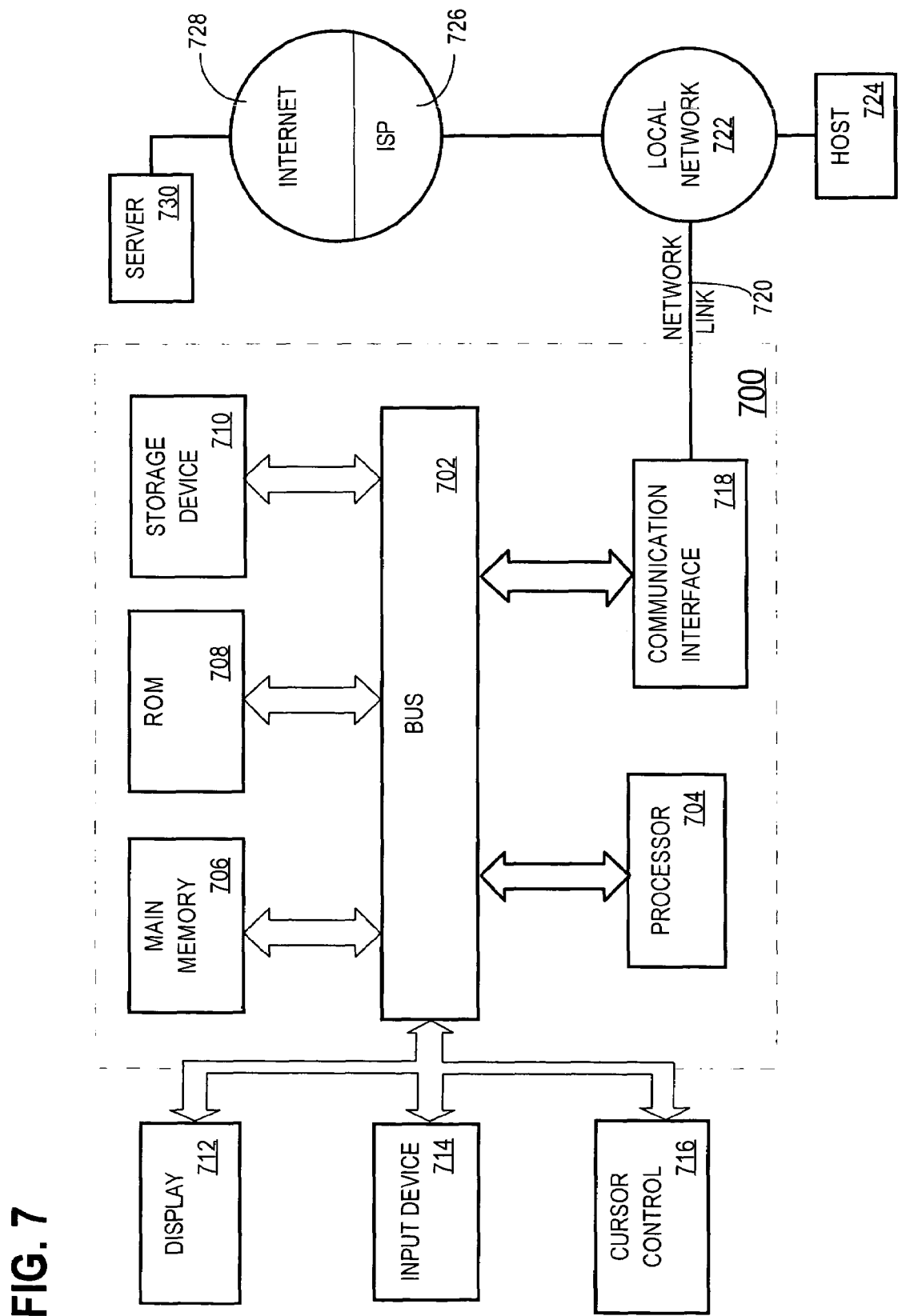
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of displaying a compound word, the method comprising:
    a search engine receiving query terms that comprise a component word;
    said search engine generating search results, wherein said search results contain an item that contains said compound word;
    said search engine locating said component word within said compound word; and said search engine displaying said compound word with said component word visibly distinguished from the remainder of said compound word in said search results;

wherein the compound word is a single unspaced word;

wherein the component word is a sequence of two or more letters within the compound word;

wherein the component word is less than all of the compound word;

wherein the step of locating said component word within said compound word comprises:

determining a plurality of stem words that are associated with said compound word; and determining, for each particular stem word of the plurality of stem words, (a) a starting position that is associated with that particular stem word and (b) an ending position that is associated with that particular stem word;

wherein the step of displaying said compound word with said component word visibly distinguished from the remainder of said compound word comprises: for each particular stem word of the plurality of stem words, displaying said compound word with letters at and between (a) the starting position that is associated with that particular stem word and (b) the ending position that is associated with that particular stem word highlighted, and with a remainder of said compound word that is not included at or in between any of the starting and ending positions unhighlighted.

2. A volatile or non-volatile computer-readable storage medium carrying one or more sequences of instructions which, when executed by one or more processors, cause the one or more processors to perform the method recited in claim 1.

3. A method of displaying a compound word, the method comprising:

a search engine receiving query terms that comprise a component word;

said search engine generating search results, wherein said search results contain an item that contains said compound word;

said search engine locating said component word within said compound word; and said search engine displaying said compound word with said component word visibly distinguished from the remainder of said compound word in said search results;

wherein the compound word is a single unspaced word;

wherein the component word is a sequence of two or more letters within the compound word;

wherein the component word is less than all of the compound word;

wherein the step of displaying said compound word with said component word visibly distinguished from the remainder of said compound word comprises: displaying said compound word with (a) said component word highlighted and (b) at least one letter immediately before and adjacent to a first letter of said component word in said compound word unhighlighted.

4. A volatile or non-volatile computer-readable storage medium carrying one or more sequences of instructions which, when executed by one or more processors, cause the one or more processors to perform the method recited in claim 3.

5. A method of displaying a compound word, the method comprising:

a search engine receiving query terms that comprise a component word;

said search engine generating search results, wherein said search results contain an item that contains said compound word;

said search engine locating said component word within said compound word; and said search engine displaying said compound word with said component word visibly distinguished from the remainder of said compound word in said search results;

wherein the compound word is a single unspaced word;

wherein the component word is a sequence of two or more letters within the compound word;

wherein the component word is less than all of the compound word;

wherein the step of displaying said compound word with said component word visibly distinguished from the remainder of said compound word comprises: displaying said compound word with (a) said component word highlighted and (b) at least one letter immediately after and adjacent to a last letter of said component word in said compound word unhighlighted.

6. A volatile or non-volatile computer-readable storage medium carrying one or more sequences of instructions which, when executed by one or more processors, cause the one or more processors to perform the method recited in claim 5.

* * * * *